United States Patent Office 2,893,447
Patented July 7, 1959

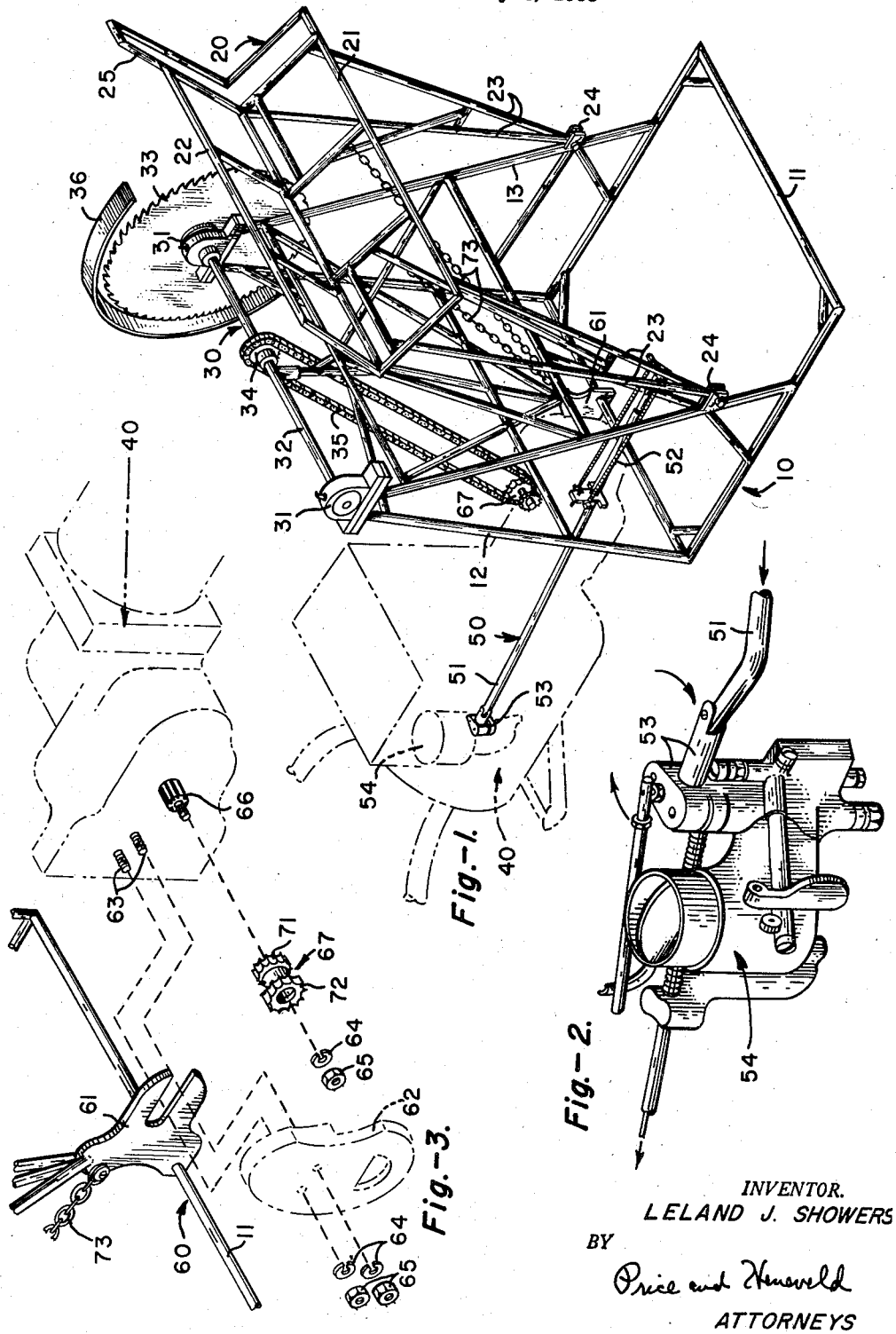

2,893,447
CONVERSION KIT FOR CHAIN SAWS
Leland J. Showers, Muskegon, Mich.
Application May 4, 1953, Serial No. 352,603
2 Claims. (Cl. 143—58)

This invention relates to motor driven portable chain saw devices and more particularly to a circular saw attachment for use therewith.

It is an object of this invention to disclose means for using a motor driven portable chain saw to power a circular saw device.

It is also an object of this invention to disclose a circular saw device having a movable work support serving as an operative control for the saw device.

Another object of this invention is to disclose means for connecting the movable work support of a circular saw attachment to the drive motor of a chain saw for idling and speeding up the motor as required for most efficient operation of the circular saw attachment.

These and other objects and advantages in the practice of this invention will be more apparent in the illustration and description of a working embodiment of the invention, as hereinafter set forth.

In the drawings:

Fig. 1 is a perspective view of a circular saw attachment and shows the motor driven portable chain saw in phantom outline.

Fig. 2 is a perspective view of the throttle operating connection between the circular saw device and the motor of the chain saw.

Fig. 3 is an enlarged and exploded view of the locating means provided between the chain saw device and the circular saw attachment.

One of numerous uses for the circular saw attachment and motor driven portable chain saw of this invention, is as a "buzz-saw" for sawing cord wood. The circular saw attachment includes a work receiving table which enables the cord wood to be placed thereon and moved relative to the wood performing saw blade. The saw blade is connected to a drive sprocket attachment on the chain saw drive motor and is driven by a sprocket chain. The movable work table is connected to the chain saw drive motor in a manner which increases the power of the drive motor as the work is advanced towards the cutting saw blade and reduces the power as the work table is retracted away therefrom.

Referring to the drawings in more detail:

The circular saw attachment 10 includes a movable work table 20. A work performing assembly 30 is provided on the frame of the saw attachment 10. A portable chain saw drive motor 40 is relatively located with respect to the circular saw attachment 10. A throttle connection 50 is provided between the movable work table 20 and the drive motor 40. An attachment connection 60 is also provided between the drive motor 40 and the frame of the circular saw attachment 10.

The circular saw assembly 10 includes a base frame 11 having a vertical back frame 12 and an angularly disposed bracing framework 13. Such cross braces and trusses may be used as are necessary to provide a strong and sturdy structure.

The work table 20 includes a work receiving or carrier portion 21 and a back rest portion 22. Table supporting arms 23 are provided and are pivotally connected as at 24 low on the bracing frame 13. The work table 20 is thus pivotal relative to the rest of the circular saw supporting framework. The work table 20 also includes a U-shaped saw guard 25 receiving the saw blade therethrough as will be later appreciated.

The work performing assembly 30 includes a pair of journal bearing blocks 31 supported at the top of the vertical frame 12. A shaft 32 is rotatably supported within the bearing blocks 31. A circular saw blade 33 is mounted on one end of the shaft. A drive sprocket 34 is provided on the shaft 32. A drive chain 35 is connected to the drive sprocket 34. A saw guard 36 is attached to the frame 12 and extends halfway around the cutting blade 35.

The portable chain saw drive motor 40 is shown in phantom outline with the chain saw removed. A throttle connection 50 is provided between the carburetor unit 54 of the drive motor and the movable work table 20.

The throttle connection 50 includes a connecting link 51 having adjustable means 52 securing it to one of the table suporting arms 23 of the movable work table unit 20. The other end of the connecting link 51 is secured to a throttle operating lever arm 53 of the carburetor unit 54. Thus, pivotal movement of the work table 20 causes reciprocation of the connecting link 50 and thereby rotates the throttle operating lever arm 53. This in turn will speed up or idle the drive motor 40.

The attachment connection 60 for locating the drive motor 40 relative to the chain saw attachment 10 includes a fork member 61 which is secured to the base frame 11. The fork member 61 is intended to be engaged with the drive motor 40. This is accomplished by removing the chain saw guard 62 and slipping the bifurcated end of the fork member 61 about the studs 63 extending from the motor unit. The plate is then returned and is secured by lock washers and nuts 64 and 65.

As previously recited, the chain saw unit has been removed from the portable chain saw drive motor 40. The usual chain saw drive sprocket is also removed from the splined shaft 66. In its place adaptor sprocket 67 is installed on the shaft 66. The adaptor sprocket 67 is secured in place by a lock washer and nut 68 and 69. The adaptor sprocket includes a chain saw drive sprocket portion 71 and a sprocket chain receiving portion 72. Thus, the drive motor 40 is adapted to operate the sprocket drive chain 35 for rotation of the circular saw blade 33, and is still useable for chain saw purposes. By loosening the guard plate 62 and disconnecting the throttle connecting link 51 from the carburetor 54 the circular saw attachment 10 and drive motor 40 may be disassociated. With the adaptor sprocket 67 the motor 40 may then be used for chain saw purposes if desired.

The movable work table 20 includes arrestor chains 73 which are secured to the fork member 61 of the attachment connection 60. These chains 73 act as stops to limit the withdrawn position of the movable work table 20 relative to the circular saw blade 33.

Operation

The circular saw attachment 10 of this invention is preferably staked to the ground when it is intended to be used for any length of time. The chain saw is removed from the portable drive unit 40 and the drive unit 40 is connected to the saw attachment 10 as previously described.

The relative relation of the drive motor 40 to the circular saw frame 10 is adjustable to acquire the proper tensioning of the sprocket driving chain 35. The throttle connecting link 51 is also adjustable by the means 52 for the desired throttle control of the drive motor 40.

Cord wood to be cut is placed upon the supporting portion 21 of the movable wood table 20. The wood table is moved towards the circular saw blade 33. The throttle connecting link 51 causes the motor 40 to be speeded up and to operate the work performing saw blade 33 much faster during the wood cutting operation. As the work table 20 is withdrawn from the saw blade 33 the throttle connecting link 51 causes the motor to idle down.

It will thus be appreciated that the drive motor unit 40 is automatically controlled to operate at higher speeds when desired and is returned to an idling condition when no work is being performed. This is accomplished through the movable work table 20 and the throttle connecting link 51 between the movable table and the motor unit 40.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

I claim:

1. A circular saw attachment to a conventional standard chain saw motor comprising: an upright frame having a rotatable saw-bearing arbor at its upper portion, a work carriage movable on the frame to and from the saw, a forked plate at the rear bottom of the said main frame, said plate inter-fitting with the guide plate clamping support of said chain saw machine, a sprocket wheel on said saw arbor, and a second sprocket wheel adapted to be attached to the drive shaft of said chain saw motor, whereby an endless roller chain actuated by said second sprocket drives said first mentioned sprocket connecting and rotating the said circular saw by said chain saw motor.

2. A circular saw attachment to a conventional standard chain saw motor comprising: an upright main frame having a rotatable saw-bearing arbor at its upper portion, and thereon a stationary safety guard attached to said frame and extending around half of said cutting member, a work carriage movable on the frame to and from the saw, a second U-shaped guard secured to work carriage guarding the remaining portion of said saw, a forked plate of the lower frame structure inter-fitting with the guide clamping support of said chain saw motor, and a sprocket wheel on said arbor and rotated thereon by an endless chain extending to a second sprocket adapted to be attached to the drive shaft of said chain saw motor.

References Cited in the file of this patent

UNITED STATES PATENTS

| Re. 16,815 | Matthews | Dec. 13, 1927 |
| 1,040,233 | Meier | Oct. 1, 1912 |
| 1,724,459 | Davis | Aug. 13, 1929 |
| 1,733,062 | Hove | Oct. 22, 1929 |
| 1,770,294 | Blundell | July 8, 1930 |
| 2,256,786 | Fritz | Sept. 23, 1941 |
| 2,326,854 | Hassler | Aug. 17, 1943 |
| 2,559,258 | Olson | July 3, 1951 |
| 2,578,097 | Soss | Dec. 11, 1951 |

FOREIGN PATENTS

| 118,817 | Australia | Aug. 14, 1944 |